R. A. GRAHAM.
Horse Rake.
No. 51,450.
Patented Dec. 12, 1865.
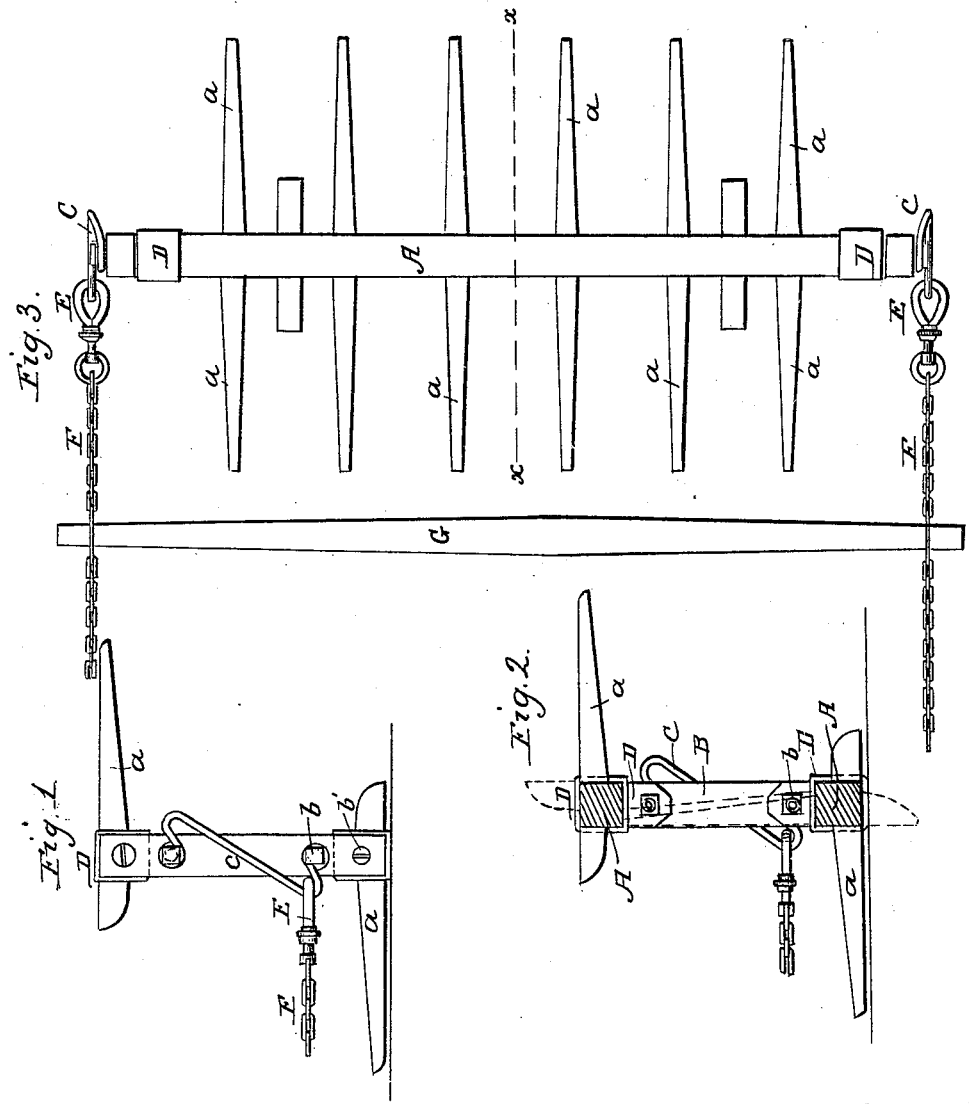

UNITED STATES PATENT OFFICE.

ROBERT A. GRAHAM, OF GREENSBURG, INDIANA.

IMPROVEMENT IN HORSE-RAKES.

Specification forming part of Letters Patent No. 51,450, dated December 12, 1865.

*To all whom it may concern:*

Be it known that I, ROBERT A. GRAHAM, of Greensburg, in the county of Decatur and State of Indiana, have invented a new and Improved Horse Hay-Rake; and I do hereby declare that the following is a full, clear, and exact description thereof, which will enable others skilled in the art to make and use the same, reference being had to the accompanying drawings, forming part of this specification, in which—

Figure 1 is an end view of the rake. Fig. 2 is a transverse section taken through the line $x\ x$, Fig. 3. Fig. 3 is a plan or top view of the rake.

Similar letters of reference indicate like parts.

My invention consists in the employment or use of two bent rods secured diagonally across the ends of the rake-frame, and in using in connection therewith a chain having a swivel-joint, whereby, when the rake is revolved, the chain will automatically change its position so as to be in proper place for drawing the rake forward; and it also consists in a novel manner of connecting the rake-shafts with the end pieces or frame, whereby the tines can be turned inward or toward each other, so as to make a more compact implement or device when it is desired to store away the same.

A represents the two shafts, carrying the requisite number of tines or teeth, $a\ a$. The said shafts are connected together at their ends by cross-pieces B B, the device for securing them thereto being a collar or metallic box, D, encircling the shafts, and secured to the cross-pieces by screws or bolts $b\ b'$. (See Figs. 1 and 2.) By withdrawing the screw or bolt $b$ the rake-teeth may be turned inward or toward each other, so that the tines will be parallel with the cross-beams B B, which will very essentially contract the dimensions of the rake. The rake-teeth project from their shafts in opposite directions in respect to each set, as shown clearly in Figs. 1 and 2.

C is the diagonal rod to which the swivels E, attached to the chain F, is secured. The form of this diagonal rod and its position on the end beams are shown clearly in Figs. 1 and 2.

G is a rod passing from one chain to the other, to keep them at the proper distance apart, and to prevent their becoming entangled in any way.

In using the rake it is necessary that it should revolve, and that the chains should change their position on the rod C, and my invention provides for this in a very satisfactory manner. By noting the position of the swivel E upon the rod in Fig. 1, it will be seen that so soon as the rake is revolved so as to bring the other set of tines into position for raking the swivel will automatically slide along the rod and rest in the bent portion at the other end of the rod, and thus be in proper position to draw along the rake. This is a very simple arrangement and a very efficient one.

What I claim as new, and desire to secure by Letters Patent, is—

1. The diagonal rod C applied to the end beams B B, substantially as and for the purpose specified.

2. The employment or use of the swivel E, in combination with the rod C, substantially as specified.

3. The manner shown of attaching the rake-shafts to the end pieces, whereby the rake may be folded, substantially as specified.

The above specification of my invention signed by me this 22d day of September, 1865.

ROBERT A. GRAHAM.

Witnesses:
SAMUEL H. RILEY,
WM. M. PYLE.